Sept. 24, 1946.　　　　H. G. BUSIGNIES　　　　2,408,041
INSTANTANEOUS VISUAL DIRECTION FINDER
Filed May 22, 1941
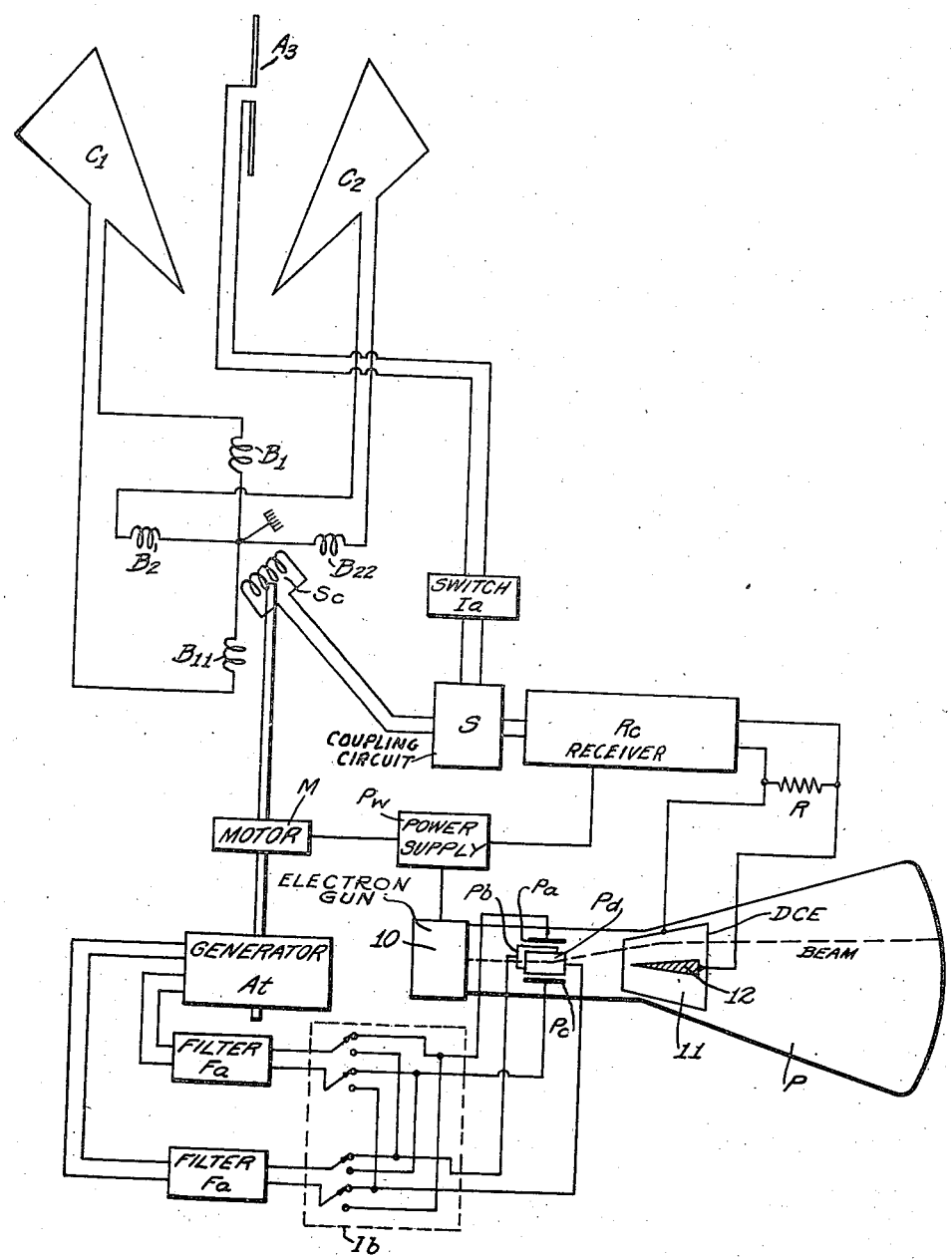
INVENTOR
HENRI G. BUSIGNIES
BY
ATTORNEY Patented Sept. 24, 1946

2,408,041

UNITED STATES PATENT OFFICE 2,408,041

INSTANTANEOUS VISUAL DIRECTION FINDER

Henri G. Busignies, Forest Hills, N. Y., assignor to Federal Telephone & Radio Corporation, a corporation of Delaware Application May 22, 1941, Serial No. 394,645

2 Claims. (Cl. 250—11)

This invention relates to direct reading direction finders, and more particularly to direction finders using cathode ray indicators.

In the past cathode ray direction finders have been proposed in which a cathode ray beam is rotated at a rate determined by the rotational frequency of a directive receiving antenna and a radial deflection of the rotating beam is produced by application of directive signals to an accelerating electrode of the tube, by application of directive signals to the conventional deflecting electrode system, or by a mechanical commutator arrangement.

While such direction finder systems are satisfactory it is preferable to provide some other positive means for causing radial deflection of the beam.

According to my invention a direction indicator is provided in which a pair of substantially frusto-conical electrodes are used to produce the radial deflection. Thus the deflection of the cathode ray may be accomplished independently of the accelerating supply potentials, the rotary deflection effects and without additional mechanical means.

A better understanding of my invention and the objects and features thereof will be had from a particular description thereof made with reference to the accompanying drawing, the single figure of which illustrates a circuit embodying the features of my invention.

The wave collector is shown as a pair of loops $C_1$, $C_2$ representing a crossed loop system. It is clear that if desired other forms of directive antennae may be used, such as for example, an Adcock aerial. A generally non-directional antenna $A_3$ is provided to give sensing indication. Crossed loops $C_1$, $C_2$ are connected to stator windings $B_1$, $B_{11}$, $B_2$, $B_{22}$, respectively, to provide the well known goniometer arrangement having a search coil Sc. The search coil Sc is coupled to coupling circuit S and over this coupling circuit to receiver Rc. Receiver Rc serves to rectify the signal so that at the output thereof impulses corresponding to the rotation of search coil Sc are produced. Sensing antenna $A_3$ is connected over switching device Ia to coupling coil S so that its effect can be obtained whenever sensing indications are required. A tube forming an oscillograph indicator is provided, this tube P having an electron gun 10 for conventional deflector plates Pa, Pb, Pc and Pd, and a special pair of deflector electrodes 11, 12. Electrode 11 is made hollow and annular in form, and shaped as a frusto-conical element, while electrode 12 is arranged concentrically of electrode 11 and preferably is of a substantially pointed or conical form. A two-phase generator At may be provided, this generator being operated by a motor M simultaneously with rotation of search coil Sc. The output of generator At is applied over filters Fa, Fb and switching device Ib to the four conventional electrodes Pa to Pd, so as to produce a uniform rotation of the cathode ray beam generated by electron gun 10. The speed of rotation of the beam is caused to be the same as the effective rotation speed of the antenna through the operation of search coil Sc. Accordingly, the beam will trace a circle on the screen of the cathode ray tube corresponding to the angular directional effect of the antenna system.

The rectified signals from the output of receiver Rc are caused to flow through a resistance R to produce a potential difference. This potential is then applied between electrodes 11 and 12 to cause radial deflection of the rotating beam corresponding to signal energy received. Thus, as the search coil is rotated indentations or extensions in the circular pattern are produced indicative of the angular rotation of sources of received energy.

It should be understood that the sense of deflection produced by electrodes 11, 12, will depend upon the polarity of the potential applied between these electrodes. Furthermore, because of the uniform annular arrangement of these electrodes the radial deflection will be the same in any angular position of the beam depending only upon the strength of signal potential developed across the resistance R. If the potential is sufficiently great the pattern traced on the screen may be in the form of a double pointed figure, reducing nearly to the center of the screen for the strongest or weakest point of the signal. Such a pattern, as produced by an alternate method has been disclosed for example in my copending application Ser. No. 380,759, filed February 27, 1941.

It should be understood that rotation of the cathode ray may be made by means of electromagnetic deflecting elements or by a pair of deflecting elements rotated at the proper speed around the cathode ray tube. The particular form of system used for developing the normal rotation of the beam is not a feature of this invention.

When a sensing indication is desired, switch Ia is operated downward to couple antenna $A_3$ to coil S and switch Ib is operated to connect the wire normally connected to plate P*a* to plate P*b*, the wire normally connected to plate P*b* to plate P*c*, the wire normally connected to plate P*c* to plate P*d*, and the wire normally connected to plate P*d* to plate P*a*. This change in connection to the normal deflecting plate is made in order to secure a 90° rotation of the sensing pattern on the screen so that it will properly align with the normal direction finding pattern. A power supply circuit P*w* is illustrated to supply all the power for the receiver, the oscillograph gun and the driving motor.

The above given description applies to a particular embodiment of my invention but should not be considered as a limitation thereon. It is clear that if desired a rotatable loop could be used in place of the fixed antenna and goniometer arrangement. Many other variations of my invention may be made without departing from the scope thereof.

What is claimed is:

1. A direction indicating arrangement including cathode ray tube, comprising an electron gun for producing a cathode ray beam, deflecting means for producing a rotation of said electron beam, and a pair of radial deflection electrodes arranged in the path of said beam, one of said electrodes being of hollow frusto-conical shape and the other electrode being of substantially conical shape so that the said cathode ray beam while rotating passes through the annular space between said electrodes receiver means including effectively rotating directional antenna means and means for detecting signals received by said antenna means, and means for applying a potential proportional to said detected signals between said radial deflection electrodes, whereby said beam may be deflected over the screen of said cathode ray tube to produce a relatively sharp visual direction indication thereon.

2. A direction indicator according to claim 1, wherein said beam is rotated in timed relation with effective rotation of said directive antenna means.

HENRI G. BUSIGNIES.